United States Patent [19]

Franke

[11] 4,177,772
[45] Dec. 11, 1979

[54] METHOD OF OPERATING A FOUR-STROKE INTERNAL COMBUSTION ENGINE AND INTERNAL COMBUSTION ENGINE FOR CARRYING OUT THIS METHOD

[76] Inventor: Walter Franke, Hittfelder Kirchweg 22, 2105 Seevetal 3, Fed. Rep. of Germany

[21] Appl. No.: 755,007

[22] Filed: Dec. 28, 1976

[30] Foreign Application Priority Data

Jan. 2, 1976 [DE] Fed. Rep. of Germany ....... 2600014

[51] Int. Cl.² ............................................. F02B 75/10
[52] U.S. Cl. ................................ 123/75 B; 123/25 C; 123/124 R
[58] Field of Search ................... 123/26, 75 B, 124 R, 123/25 C

[56] References Cited

U.S. PATENT DOCUMENTS

| | | | |
|---|---|---|---|
| 1,611,429 | 12/1926 | Fish | 123/25 C |
| 1,892,124 | 12/1932 | Abell | 123/75 B |
| 1,963,780 | 6/1934 | DuBois | 123/75 B |
| 2,584,560 | 2/1952 | Darche | 123/25 C |
| 2,789,547 | 4/1957 | Mallory | 123/75 B |
| 2,807,250 | 9/1957 | Mallory | 123/75 B |
| 3,908,613 | 9/1975 | Loby | 123/25 C |
| 3,964,451 | 6/1976 | Goto | 123/75 B |
| 3,977,373 | 8/1976 | Sand | 123/117 A |
| 4,007,718 | 2/1977 | Laprade et al. | 123/26 |
| 4,037,406 | 7/1977 | Hartel | 123/124 R |
| 4,060,061 | 11/1977 | Might | 123/26 |

*Primary Examiner*—Charles J. Myhre
*Assistant Examiner*—David D. Reynolds
*Attorney, Agent, or Firm*—Toren, McGeady and Stanger

[57] ABSTRACT

A method of operating a four-stroke internal combustion engine of the carburetor or fuel injection type, with one or several reciprocating pistons or one or several rotary pistons wherein during the intake movement of the one or the several pistons an additional gaseous or liquid or gas-liquid mixture fluid is introduced into the cylinder working space through a cylinder side wall aperture in the vicinity of the piston to establish a layer charge overlying the piston. The introduction of this fluid may be effected by suction effects caused by the piston movement. The amount of fluid supplied may be controlled in dependence upon combustion pressure and/or exhaust gas composition. The internal combustion engine includes an aperture in a cylinder wall in communication with a fluid source whereby this aperture is adapted to be obstructed or exposed by the moving piston to control the admission of the additional fluid. Between the aperture and the fluid source may be provided control valve means.

14 Claims, 8 Drawing Figures

METHOD OF OPERATING A FOUR-STROKE INTERNAL COMBUSTION ENGINE AND INTERNAL COMBUSTION ENGINE FOR CARRYING OUT THIS METHOD

The present invention relates generally to a method of operating a four-stroke internal combustion engine and an internal combustion engine that is adapted to be operated according to this method.

Particularly, the present invention relates to a method of operating a four-stroke internal combustion engine with controlled intake of a fuel or a fuel gas mixture and a controlled exhaust of combustion gases in association with at least one enclosed working space in which is movable a piston, an ignition device and optionally a fuel injection device being associated with the working space, wherein separately an additional fluid for establishing a layer charge is supplied to the working space.

The internal combustion engine of the four-stroke type adapted to carry out this method of the invention is an engine of substantially conventional design and assembly and has at least one cylinder with a piston movable therein and associated with this cylinder-piston assembly a controlled inlet for a fuel-gas mixture and a controlled outlet for combustion gases, the controlled inlets and outlets including respective inlet and outlet valves, the piston in a portion of its cycle is adapted to draw in a fuel gas mixture through the controlled inlet.

Preferably the present invention may be applied to an internal combustion engine having at least one cylinder with a piston reciprocated within the working space, as well as controlled inlet and outlet valves arranged in the cylinder head. The piston may include several piston rings and may be connected to a crank assembly.

According to another embodiment, the present invention likewise relates to a method in an engine having at least one rotary piston movable within the working space, and to an internal combustion engine of the relevant type. In this engine a piston of a substantially triangular configuration is rotatably journalled in a cylinder cavity. Controlled inlet and outlet valves are usually disposed in a position opposite an ignition or an injection device. In internal combustion engines of this type it is already known to introduce compressed air by means of compressors, in the vicinity of the outer circumference of working spaces. The term "four-stroke internal combustion engine" is intended to encompass Otto type motors as well as Diesel engines. An important criterion is that there are an intake stroke, a compression stroke, a working stroke and an exhaust stroke or respectively corresponding functions occur in working spaces.

As pointed out above, the method and the internal combustion engine of the present invention may include the heretofore known feed of air or richer mixtures and less richer mixtures in dependence upon working conditions in the region of the upper or respectively outer working space portion or respectively the cylinder head. This may allow additional improvements, and according to a proposed embodiment a liquid substance may be introduced subsequent to ignition and/or fuel injection. Alternately, there may be injected a gaseous substance instead of a liquid into this region.

The heretofore known methods and internal combustion engines are delimited insofar as at the upper or outer section of the working space or at the cylinder head are provided the feed means whereby a layer charge is intended to be achieved e.g. by initially feeding a lean mixture followed by a richer mixture during an intake stroke of the piston and in adaptation to the piston movement. Stepped feeding of this type is of only limited efficiency because during feeding turbulence will be encountered within the working space. In this context it should be pointed out, however, that the above mentioned additional fluid may also consist of a leaner mixture, i.e. of a mixture having an increased proportion of air with respect to the proportion of fuel. As a liquid fluid there may likewise be employed water. Heretofore it has only been known to inject water either during compression or into the intake duct. When injecting water into the intake duct, no layer charge will be obtained. When injecting water during compression, there will occur mixing by which the layer charge will be destroyed. This has been advantageous merely as an antiknock agent.

In Diesel engines it is merely known to mix the fuel, i.e. Diesel oil, with water, prior to intake in association with water injection.

It is an object of the present invention to provide a novel and improved method of operating a four-stroke internal combustion engine.

It is another object of the present invention to provide a novel and improved internal combustion engine.

It is still another object of the present invention to provide a novel and improved method of operating a four-stroke internal combustion engine and a suitable internal combustion engine therefor in which a layer charge that is inherently amenable to a more favorable operation of the engine with respect to output power as well as to a reduction of the pollutants in the exhaust gases may be further improved by effectively establishing an unique layer charge pattern above the piston head or respectively directly at a piston side wall delimiting the working space.

In accordance with the present invention the additional fluid is supplied to the working space directly at a side wall of the piston facing the working space when the piston performs an intake stroke or is in the intake phase respectively, this fluid being supplied at a position spaced from the controlled inlet for the working space. Due to the fact that this additional fluid is not introduced from the upper portion or the cylinder head or respectively from the outer circumference of the cylinder chamber but at a position spaced from this upper portion or cylinder head in an engine having a reciprocating piston or respectively at a minimum inner radius in a rotary piston engine there will be obtained a narrow layer charge. This formation of the layer charge is enhanced by the fact that the fluid is introduced when the piston moves towards its bottom dead center position, i.e. the volume of the working space is being enlarged. During this period of operation a gradually increasing space is available for introducing this fluid below the mixture or fluids introduced through the controlled inlet, and the layer charge may be formed in this space.

In a preferred embodiment of an internal combustion engine having a reciprocating piston the additional fluid is suitably introduced or respectively aspirated into the lower half up to substantially an intermediate height of the cylinder working space. "Substantially" is intended to cover the range of high piston speeds. It is particularly advantageous that the suction effect generated by the piston moving within the working space introduces the additional fluid immediately at the piston wall and underneath the mixture that is being introduced into the inlet. This allows a surprisingly simple realization of the method whereby no additional pressurizing means are required. In an engine with a reciprocating piston the additional fluid is introduced directly above the piston head when the piston moves towards its bottom dead center position, and thereby spaced from inlet and outlet in the working space head. The suction effect generated by the piston moving towards its bottom dead center position at least enhances the entry of the additional fluid.

In an embodiment of an internal combustion engine comprising a rotary piston the additional fluid is advantageously introduced while the inlet is still open, and in a position immediately in front of a side wall of the rotary piston, through a side wall of the working space, the position coinciding substantially with a smallest diameter circular path along which moves a central portion of the rotary piston side wall.

In a particularly preferred embodiment the additional fluid may be air. Surprisingly, it has been found that in this manner may be obtained not only an increased output power but likewise an improved exhaust gas composition with respect to pollutants whereby additionally the piston head is being cooled. Since the air is drawn in directly by the piston, the layer necessarily overlies the piston.

The additional fluid supplies may generally be a gaseous or a liquid substance. When employing a liquid fluid, the same is selected to provide power under the pressure and temperature conditions in the working space subsequent to ignition. This liquid may consist of water. With this are achieved already an increased output power or respectively a reduced fuel consumption and less knocking characteristics in combination with a favorable heat balance of the motor. In a particularly preferred embodiment the liquid may consist of a mixture of water and oil whereby the quantity of oil corresponds to a portion of 1/50 to 1/100, i.e. there may virtually by employed so-called drilling oil. With this oil may be obtained the additional advantage of an improved lubrication and a reduced lubricating oil consumption of the engine. Likewise employed may be a liquid mixture of water and an alcohol whereby the alcohol portion may comprise from about 1/10 to ⅓ of the overall liquid mixture. Suitable alcohols are fuel alcohols, methanol or methylene alcohols. The inventive layer charge that is characterized by its unique introduction into the cylinder may be employed, in an advantageous embodiment, to improve the operation of an internal combustion engine by metering the fluid intake in dependence upon the explosion pressure within the working space. This means that the feed will be increased when the explosive pressure peak increases. For control purposes there may be provided still further embodiments described further below.

In another preferred embodiment the fluid intake may be metered in dependence upon the exhaust gas composition. The intake will be increased when the CO content in the exhaust gases increases. This constitutes a particularly advantageous embodiment.

Feeding of the additional fluid may be achieved advantageously by the movement of the piston in an enlarging space so that the fluid will be drawn in immediately at the piston and in a position spaced from the mixture inlet. This arrangement constitutes the preferred embodiment. The intake of fluid may likewise be enhanced by pressurizing the fluid.

The furthermore proposed internal combustion engine includes an aperture in the wall of the cylinder, the aperture is spaced from the inlet and is adapted to be controlled by the moving piston so that the aperture is exposed for drawing an additional fluid into the cylinder into a space between a surface of the piston and the medium drawn in through the controlled inlet. In both the above types of internal combustion engines the apertures may be controlled merely by the piston. This likewise applies to the embodiment with a reciprocating piston. A motor of this type advantageously includes an aperture in the side wall of the cylinder at substantially half the height of the working chamber as defined by the piston stroke. In this motor, preferably valve means are associated with the aperture in the cylinder wall.

The invention thus provides an one-cylinder or a multi-cylinder internal combustion engine the cylinder walls of which include bored passages with valve means in a substantially medium height. Beyond the valve means, the bored passages may be in unrestricted communication with the ambient atmosphere. In this case, the piston draws in as additional fluid simply air. Surprisingly it has been found that in an embodiment of this type, i.e. without employing an additional booster pump, an additional fluid source or the like, the piston itself generates a pumping effect and thus ensures the formation of a layer immediately above the piston head.

The piston may include several piston rings and may also be connected to a crank assembly. In a particularly preferred embodiment of the present invention the aperture may be located in a height of the cylinder side wall which height corresponds to a position of the crank arm of the crank assembly within an angular range of from 90° to 30° ahead of the piston bottom dead center position with respect to the upper edge of the uppermost of the several piston rings. By this expedient is predetermined an intermediate region whereby in a suitable embodiment the crank arm of the crank assembly may be at an angle in the range from 60° to 30° under the above stated conditions.

In an internal combustion engine with a rotatably journalled rotary piston of a substantially triangular configuration the aperture is suitably provided at the working space corresponding to the intake phase in a position in which the aperture is exposed by an intermediate portion of a piston face wall between two corners of the piston. By this expedient, the aperture is disposed inwardly as far as possible and suitably somewhat closer to the ignition or injection device than to the inlet.

Preferably, the aperture consists of a bored passage. Particularly in an internal combustion engine with a reciprocating piston an one-way valve or a diaphragm valve is arranged exteriorly of the cylinder and is connected to this bored passage. This one-way valve or diaphragm valve opens, provided the bored passage is open at its outer end, within the working space after an uppermost piston ring of the piston has moved past the aperture and a negative pressure with respect to ambient atmospheric pressure is generated above the piston so that air may enter the cylinder. The same likewise applies to the feeding of a liquid which is advantageously kept under atmospheric pressure. Surprising results may be obtained in a standard type internal combustion engine, particularly if the latter includes reciprocating pistons, by bored passages at predetermined positions of these cylinders and one-way valves associated with these bored passages. The output power of these engines may be increased and the amount of pollutants in the exhaust gases may be reduced.

According to a particular embodiment the valve means may consist of control valves for varying the free cross-sectional area of a duct in communication with the aperture in dependence upon the power output and/or the exhaust gas composition of the engine. This readily allows adaptations. A wall portion of the working space such as a wall portion adjacent the cylinder head may be yieldable and may be connected to a sensor adapted to control the control valve. This allows to control the valve in dependence upon the motor output. In another embodiment which may concurrently be employed, a probe adapted to monitor the exhaust gas composition is arranged downstream of the outlet of the exhaust duct and a signal transmitter is connected to the probe and is adapted to operate the control valve. This allows adjustment of the valve means in dependence upon the composition of the exhaust gases.

Suitably the aperture is of a diameter of approximately 10 mms. This diameter is sufficient for control purposes. Smaller diameters may likewise be provided.

In an internal combustion engine with a reciprocating piston a slide plate projecting beyond the piston wall may be mounted at the piston wall in a wall portion adapted to be reciprocated in front of the aperture. This allows to prevent feeding of additional fluid between piston rings.

In an internal combustion engine including a plurality of cylinder piston assemblies such as in a four-cylinder or in a six-cylinder engine all of the cylinder apertures may be connected to a manifold and control valve means in the form of an adjustable throttle assembly is mounted in the manifold downstream of a port or respectively a fluid source. The throttle assembly may be controlled as pointed out above in dependence upon the output power or the exhaust gas composition. The manifold may be in free communication with the ambient atmosphere or may be connected to a source of a special gas or a liquid. The fluid may also be pressurized by a booster pump or the like and alternately the fluid may be contained in a pressurized reservoir.

The diameter of the aperture is dependent upon the compression ratio of the engine and is selected accordingly. All of the apertures may be connected to one and the same manifold, and this manifold may be supplied from the fan of the motor. By providing throttle means within the manifold, valves at the bored passages may be dispensed with.

By the present invention may be achieved a power increase or respectively a reduction of fuel consumption in the range of about 10 to 30 percent, as compared to conventional internal combustion engines whereby it should be emphasized that no particular injection means for the layer charge, compressors or the like must be provided. Additional devices of this type may of course likewise be incorporated.

In the following, the present invention will be explained more in detail with reference to the embodiments illustrated in the appended drawings wherein FIG. 1 is a partly sectional elevational schematical view of a cylinder piston assembly, the piston being in its top dead center position;

Figure 1:
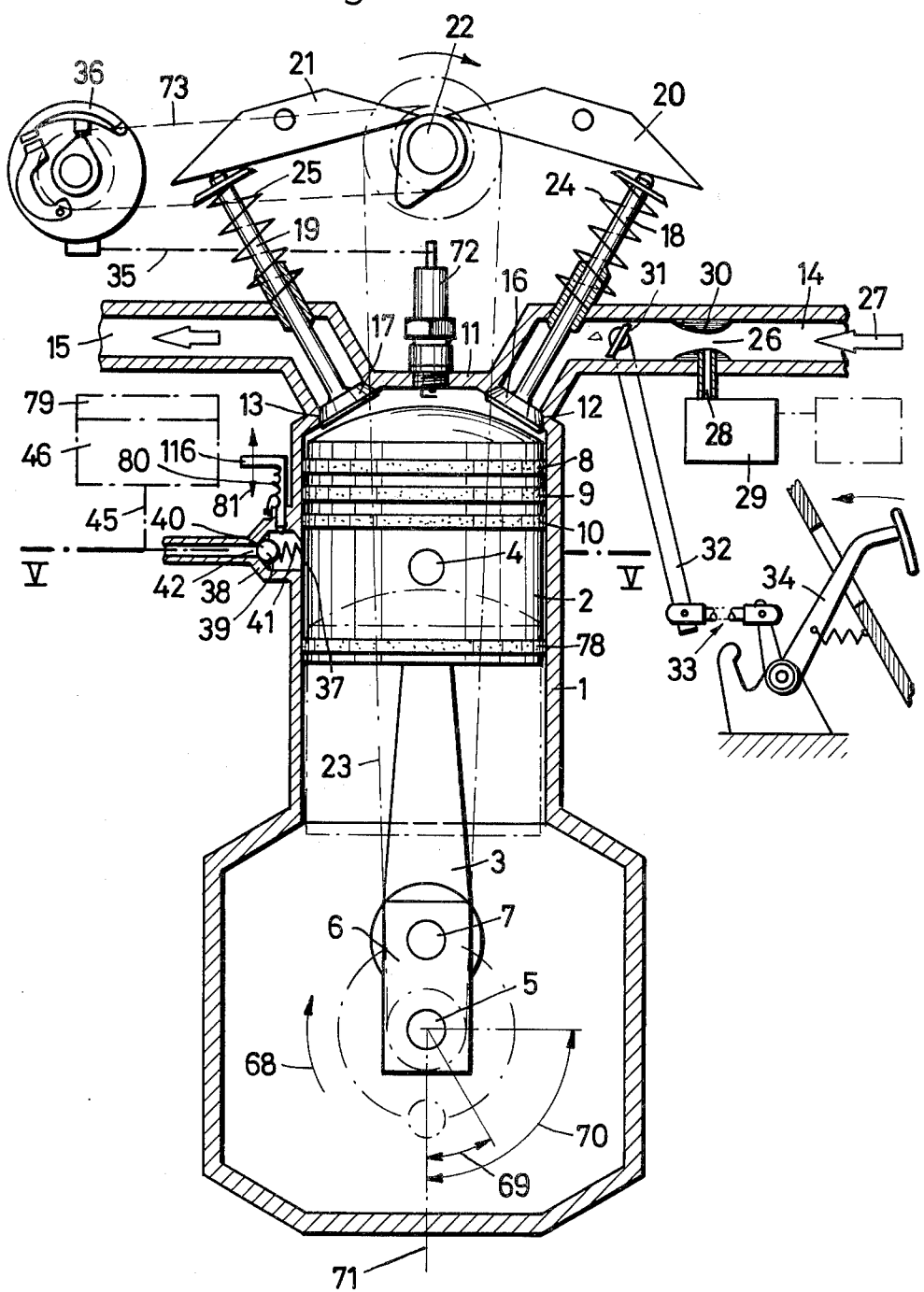

Referring to FIG. 1 there is schematically illustrated a cylinder piston assembly consisting of a cylinder 1 in which is movable a piston 2. The piston 2 is connected to a connecting rod 3 by a gudgeon pin 4. The opposite end of the connecting rod 3 is connected to a crank assembly including a crank shaft 5 with crank arms 6 and a crank shaft pin 7 to which is articulated the connecting rod 3. The piston 2 includes e.g. the piston rings 8 to 10 sealing the piston against the inner side wall of the cylinder 1.

The cylinder head 11 includes an inlet opening 12 and an outlet opening 13. These openings define valve seats and are connected to an inlet duct 14 and an outlet duct 15 respectively. The valve seat inlet opening 12 is engaged by an inlet valve 16, and the valve seat outlet opening 13 is engaged by an outlet valve 17. The valves 16, 17 are controlled by their valve stems 18, 19 in a known manner by associated rocker levers 20, 21 through a cam shaft 22. The cam shaft 22 is driven by the crank shaft 5 in a known manner through a gear assembly 23 at a transmission ratio 1:2. Springs 24, 25 are associated in a known manner with the valve shafts 18, 19 and serve to bias the valve shafts against the rocker levers.

The outlet duct 15 is connected to the exhaust. The inlet duct 14 includes a throttle assembly 26 of a conventional type. The inlet duct 14 is connected at its one end through an air filter (not shown) to the ambient atmosphere so that ambient air may be drawn in in the direction of the arrow 27. The throttle assembly 26 is connected to a fuel source 29 through a passage 28. The throttle assembly 26 includes a throat portion 30 into which opens the passage 28. In this throat portion 30 is provided a throat or butterfly valve 31. The valve 31 may be adjusted in a known manner through a linkage 32, 33 by an accelerator lever or a pedal 34.

An ignition or injection device 72 is also arranged within the cylinder head 11. The ignition or injection device 72 is connected, by a functional connection 35, to a distributor 36 when the engine is provided with an ignition device. The distributor 36 is driven by the cam shaft 22 via a 1:1 transmission 73.

The aforedescribed parts of the internal combustion engine are conventional.

According to an important aspect of the present invention an aperture 37 is provided in an intermediate region of the side wall of the cylinder 1. This aperture 37 may be in communication with an external sleeve 38. An one-way valve 39 may be arranged within the sleeve 38. The valve 39 includes a valve body 40 that may open a passage by moving toward the cylinder cavity. The valve body 40 is biased by a spring 41 of relatively weak spring characteristics. This spring 41 is provided only for the reason to open the valve under the pressure differential between the atmospheric pressure e.g. at the open end 42 of the sleeve 38 and the negative pressure in the working space within the cylinder 1 when the uppermost piston ring 8 has been moved past the aperture 37 in a downward direction. The height of the aperture 37 with respect to the crank assembly is selected so that during downward movement of the piston 2 and when the upper piston ring 8 has moved past the aperture 37 the valve body 40 will be lifted away from its seat so that e.g. air may be aspirated into the cylinder.

Figure 2:
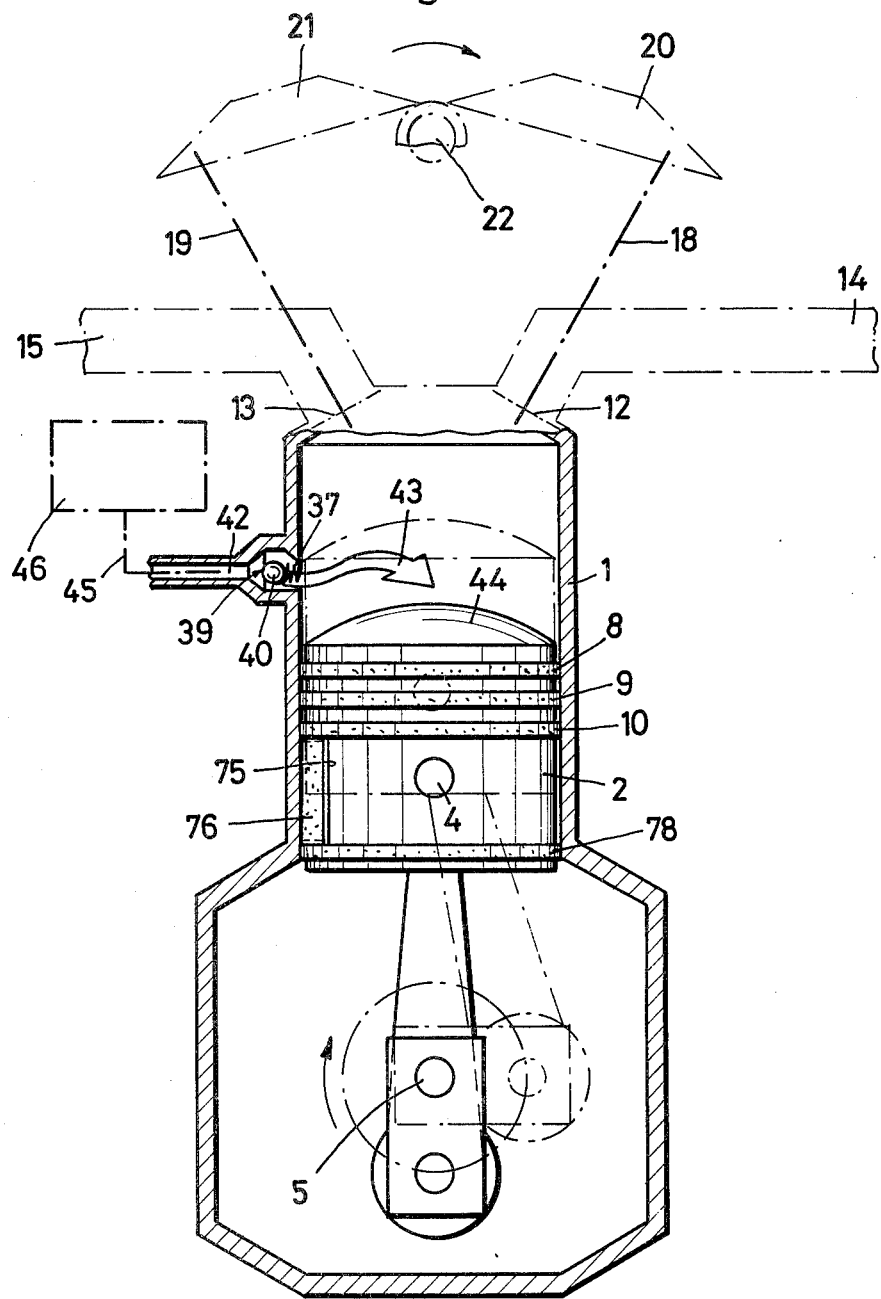
FIG. 2 is a view similar to FIG. 1 wherein the piston is in its bottom dead center position.

In the embodiment shown in FIG. 2 similar parts have been indicated by the same reference numerals. As may be seen, air will be drawn in immediately above the piston head 44, as indicated by the arrow 43 so that this aspirated air will in any case underlie the fuel gas mixture supplied through the inlet opening 12.

As shown in FIG. 1, the open end 42 of the valve 40 may be connected by a duct 45 to a source 46 containing a gas or a liquid and advantageously a water-oil emulsion which will be drawn into the cylinder.

When the source includes a reservoir 46 the contents of this reservoir may be pressurized in thus accelerating the opening of the valve 39.

Figure 5:
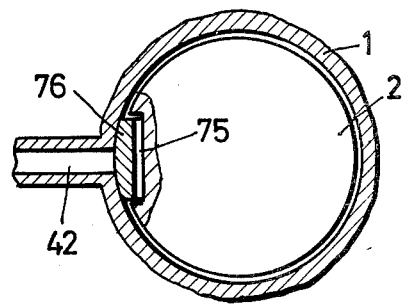
FIG. 5 is a cross-section along the line V—V of FIG. 1.

As may be seen in FIG. 2, a recess 75 is provided at the piston 2 between the piston ring 10 and another additional lower piston ring 78. As likewise shown in FIG. 5, this recess 75 extends over a relatively small circumferential region of the piston which region is moving past the aperture 37. A piston slide 76 is mounted in this recess 75. The piston slide 76 slides along the inner side wall of the cylinder 1, between the adjacent piston rings, and obstructs the aperture 37 when being moved past the same so that no take-in is possible during the respective part of piston movement.

Figure 6:
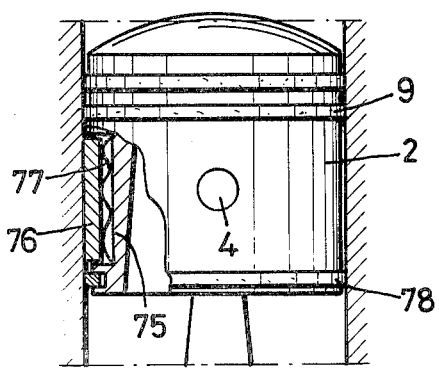
FIG. 6 is a fragmentary lateral elevational and partly sectional view of a modified type of piston.

In FIG. 6 similar parts are identified by the same reference numerals. As may be seen from this FIGURE, the recess 75 is spaced from the adjacent piston rings 9, 78 so that the piston slide 76 is being guided at its upper and lower ends by wall portions of the recess 75. For ensuring that the piston slide engages the adjacent cylinder wall, the piston slide 76 may be biased by an internal spring 77 urging the slide outwardly from the piston.

The piston slide represents a special modification. No such piston slide is shown in FIG. 1, and it may be understood that a piston slide is not necessarily required.

As may be seen in FIG. 1, a compressor 79 for compressing the source fluid may be associated with the fluid source 46.

The valve 39 is operatively coupled to a locking means 80 that is movable in the directions indicated by the double headed arrow 81, optionally in dependence upon the motor operation, for selectively retaining the valve body 40 against its valve seat, i.e. for blocking the aperture 37. Advantageously the aperture 37 is blocked when the motor is at a low operating temperature as after start-up.

Figure 3:
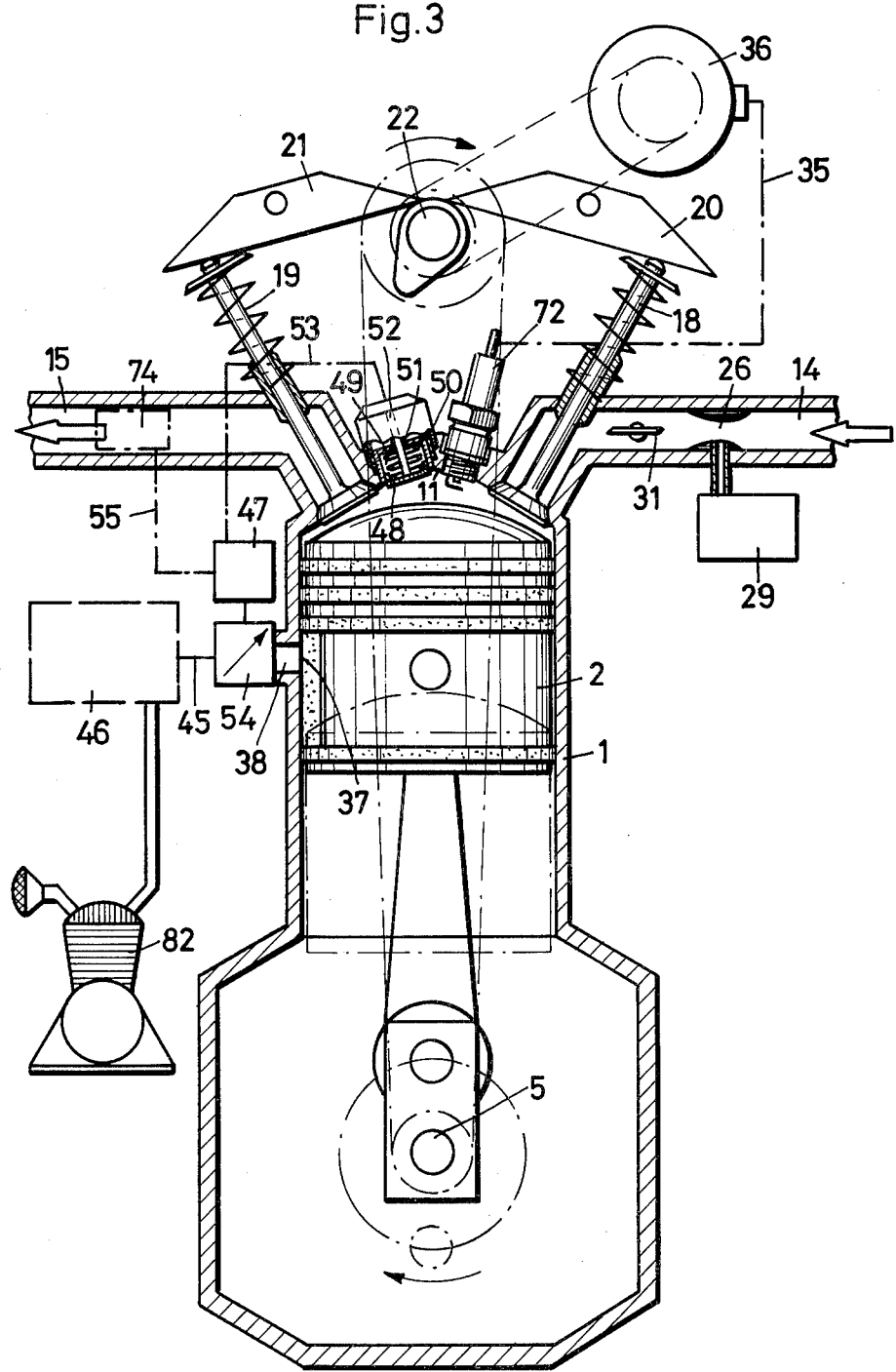
FIG. 3 is a view similar to FIG. 1 illustrating a particular embodiment of an internal combustion engine in accordance with the present invention such as an one-cylinder engine having a yieldable wall portion in the upper range of the working space, in additionally illustrating optional exhaust gas composition control means.

In FIG. 3 similar parts have been identified by the same reference numerals. The one-way valve 39 of FIG. 1 has been replaced by a so-called control valve 54 which is operatively coupled to positioning means 47. In this embodiment a wall portion 48 of the cylinder 11 defines a diaphragm or a piston at the bottom end of a chamber 49 integrally connected to the cylinder head. The diaphragm or piston 48 is biased by a spring 50. The diaphragm or piston 48 is likewise engaged by a sensor 52 that extends outwardly from the chamber 49 through suitable sealing means 51. The sensor 52 is connected, by a linkage or a suitable operative connection 53, to the positioning means 47 for the control valve 54 which replaces the one-way valve. Thus the pressure on the piston 2 within the cylinder 1, i.e. within the working space may be utilized for feeding the additional fluid through the aperture 37.

As also shown in FIG. 3, a probe 74 may be arranged in the exhaust duct 15 and may be connected by a suitable operative connection 55 to the positioning means 47, for adjustment of the control valve 54.

As may be seen in FIG. 3 that illustrates the preferred embodiment in which the duct 45 is open, the connected fluid source 46 may be pressurized by means of a compressor 82.

Figure 4:
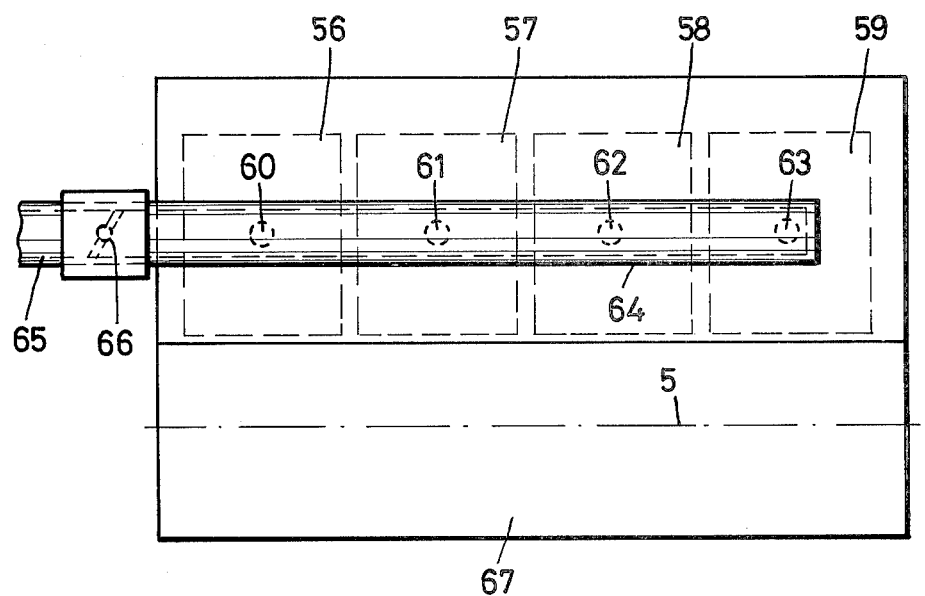
FIG. 4 is a fragmentary schematical elevational view of a multi-cylinder internal combustion engine having a manifold and common control valve means.

In FIG. 4 are shown e.g. four cylinder-piston assemblies 56 to 59, each having a cylinder aperture 60 to 63 in an intermediate cylinder region, and these cylinder apertures are interconnected by a manifold 64. In the region of the outlet opening 65 of this manifold 64 is provided a throttle assembly 66 or a control valve assembly, either assembly adapted to be controlled by one of the methods described with reference to FIG. 3. The crank case in FIG. 4 is identified by the reference numeral 67.

Referring once more to FIG. 1, it should be pointed out that the aperture 37 is arranged in a height selected so that the upper point ring 8 with its upper edge is just below the aperture when the crank arm 6 of the crank assembly rotating in the direction indicated by the arrow 68 is in a position at an angle 70 corresponding to 90° or at an angle 69 corresponding to 30° ahead of the bottom dead center position of the piston 2 with respect to the cylinder axis 71. By this expedient there is available a substantial intake space or respectively intake volume for aspirating a fluid through the aperture 37.

The diameter of the aperture as above described is suitably approximately 10 mms, and the free cross-sectional area may be varied by employing a control valve.

Additional manual control means 80 for overriding the control or one-way valve may be provided, particularly for obstructing the apertures 37 or the manifold 64 during start up of the engine or when the same is operating at low temperatures. The valve body of an one-way valve may be positively retained against its seat e.g. by means of a guide member in a control valve. The closed position may be adjusted by a suitable control linkage.

An important characteristic of the present invention is that the cylinder aperture is provided in an "intermediate" region of the working space, i.e. in a region between the intermediate range of the working space as defined by the piston stroke and with respect to the upper piston ring 8 and the bottom dead center position of the piston or the uppermost piston ring 8 respectively.

Figure 7:
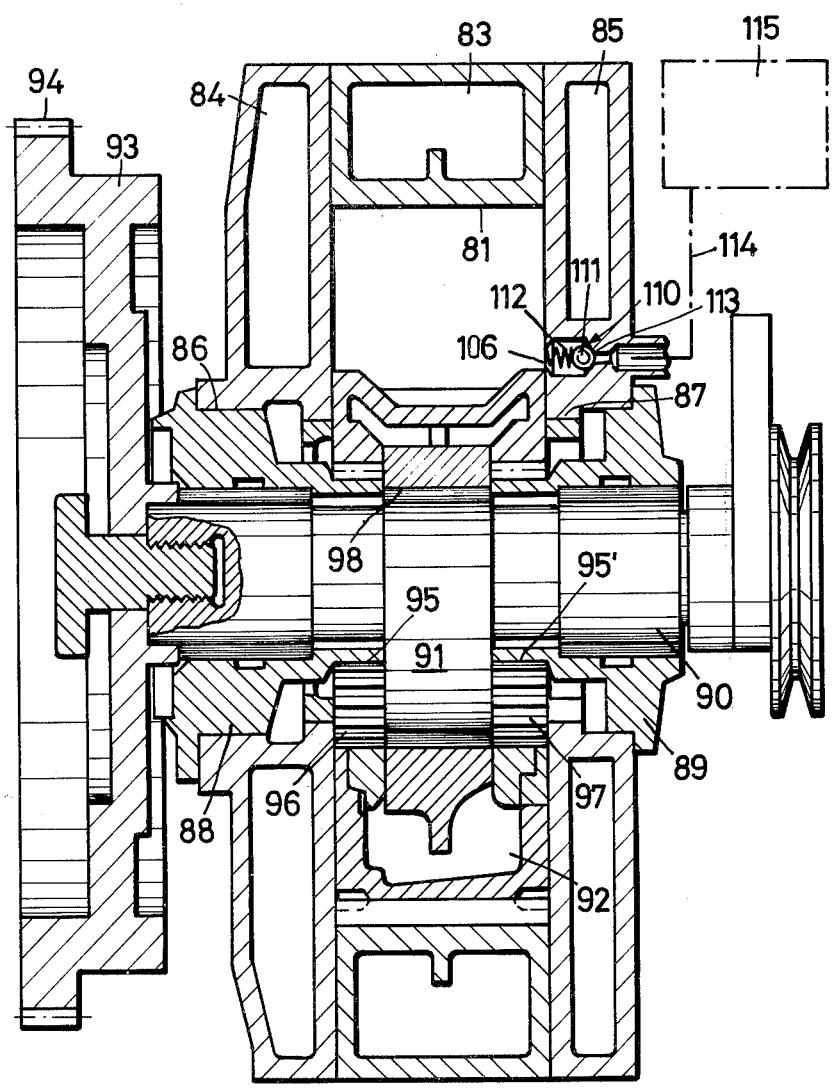
FIG. 7 is a schematical cross-sectional view of a rotary piston engine along the line VIII—VIII of FIG. 8.
Figure 8:
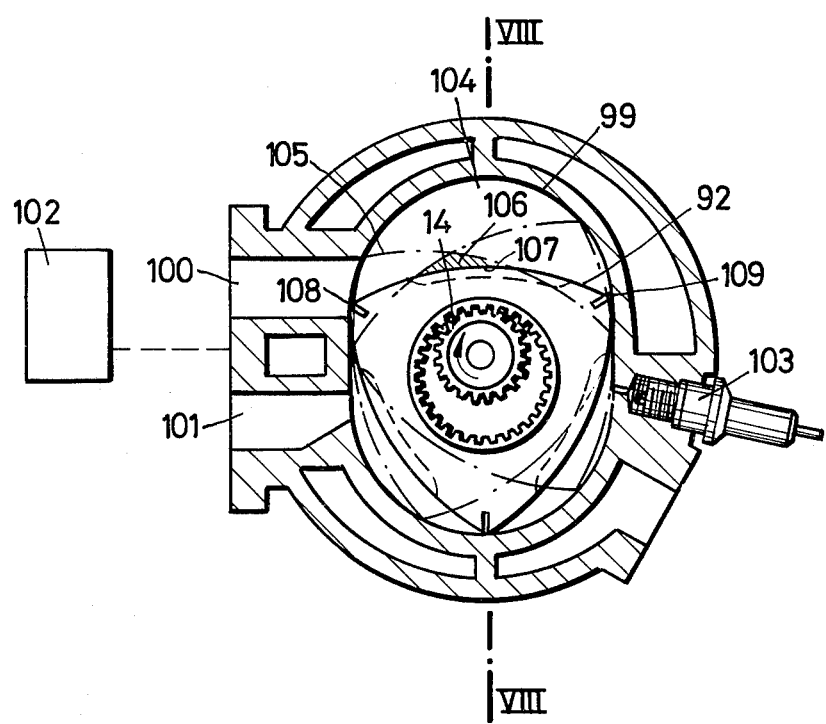
FIG. 8 is a lateral elevational sectional view of the rotary piston engine of FIG. 7.

The rotary piston engine shown in FIGS. 7 and 8 includes a casing 83 the walls of which may be provided with cavities for cooling purposes. Lateral casing members 84, 85 are provided with bearing apertures 86, 87 in which are mounted bearing flanges 88, 89 for the so-called eccenter shaft 90. The eccenter shaft 90 includes an eccenter 91 which in the illustration of FIG. 7 projects downwardly whereby in FIG. 7 the piston 92 is likewise shown in its lower position. The eccenter shaft may be connected to a flywheel 93 provided with drive teeth 94. A pinion 95 is provided at a portion of the bearing flange 88 for the eccenter shaft projecting into the casing 83. Another pinion 95' may be provided at the opposite side of the casing. Annular gears 96, 97 are rigidly mounted in the piston 92. These annular gears engage by their internal teeth the pinions 95, 95'. A piston bearing 98 bearing against the eccenter 91 is provided at the piston 92 intermediate the two annular gears 96, 97. The aforedescribed characteristics are conventional.

As may be seen in FIG. 8, the rotary piston 92 is of a substantially triangular configuration and wipes along the inner wall 99 of the casing 83. This inner wall 99 is of a corresponding conventional configuration suitable for these types of engines.

An intake duct 100 and an exhaust duct 101 open into the casing through a front extension. The intake duct serves as is conventional to introduce fuel or a fuel-gas mixture and is in communication with a carburator 102. The exhaust duct serves to receive the combustion gases. In a position approximately opposite the intake and exhaust ducts is provided a means 103 such as a spark plug or a fuel injection device.

The aforedescribed engine characteristics are conventional.

As may be seen in FIG. 8, the space 104 in communication with the intake duct 100, i.e. the so-called intake space will initially increase in volume during rotation of the rotary piston 92 until the piston is in a position as indicated schematically by the chain line 105 in which a corner of the rotary piston 92 has moved past the intake duct 100.

In the lateral casing member 85 is provided an aperture 106 in a position in which this aperture may be exposed by an intermediate portion 107 of the piston 92, i.e. by a wall portion approximately intermediate two corners 108, 109 of the piston. The aperture 106 thus virtually coincides with a circular path of minimum radius about the axis of the eccenter shaft 90 which path may be exposed by the piston 92.

The aperture 106 may provide an unrestricted communication with the ambient atmosphere. In a preferred embodiment as shown in FIG. 6 an one-way valve 110 is provided and the valve body 111 thereof is urged outwardly against the valve seat 113 by a weak spring 112. Especially in rotary piston engines a valve may be omitted in advantageous embodiments. The essential aspect is the spatial location of the aperture 106 for establishing a layer charge immediately on the piston wall.

As schematically illustrated in FIG. 7, the aperture 106 may comprise an one-way valve 110, and the one-way valve may be connected by a conduit 114 to a source of fluid 115.

The embodiments of the invention in which an exclusive property or privilege is claimed are defined as follows:

1. An internal combustion engine comprising: cylinder means; piston means operably reciprocable within said cylinder means; inlet means for introducing a combustible fuel-air mixture into said cylinder means; ignition means for igniting said mixture; exhaust means for removing combustion gases from said cylinder means; aperture means defined to extend in flow communication with said cylinder means; source means for supplying an additional fluid into said cylinder means through said aperture means; valve means interposed between said source means and said aperture means for controlling the flow of said additional fluid therebetween; sensing means for sensing combustion pressure within said cylinder means; valve control means responsive to said sensing means for controlling operation of said valve means in accordance with the sensed value of combustion pressure within said cylinder means; means for sensing the composition of said combustion gases in said exhaust means; and further valve control means responsive to said composition sensing means for controlling jointly with said valve control means operation of said valve means in response to sensed composition of said combustion gases.

2. An internal combustion engine according to claim 1 wherein said cylinder means comprise internal wall means defining combustion chamber means and wherein said sensing means comprise means defining a portion of said internal wall means.

3. An internal combustion engine according to claim 2 wherein said means defining a portion of said internal wall means comprise yieldable means resiliently movable in response to combustion pressure within said combustion chamber means.

4. An internal combustion engine according to claim 2 wherein said means defining said portion of said internal wall means comprise diaphragm means.

5. An internal combustion engine according to claim 2 wherein said means defining said portion of said internal wall means comprise spring biased piston means.

6. An internal combustion engine according to claim 1 wherein said source means include compressor means for supplying said additional fluid under pressure.

7. An internal combustion engine according to claim 1 wherein the quantity of additional fluid supplied through said aperture means is controlled by said valve control means in dependence upon said sensed values of combustion pressure.

8. An internal combustion engine according to claim 1 wherein the quantity of additional fluid supplied through said aperture means is controlled by said further valve control means in dependence upon said sensed composition of said combustion gases.

9. An internal combustion engine according to claim 1 wherein said additional fluid is a liquid.

10. An internal combustion engine according to claim 1 wherein said additional fluid comprises a mixture of water and oil and wherein said oil comprises between about 1/50th and 1/100th of said mixture.

11. An internal combustion engine according to claim 1 wherein said additional fluid comprises a mixture of water and alcohol and wherein said alcohol comprises between about 1/10th and ⅓rd of said mixture.

12. An internal combustion engine according to claim 1 wherein said composition sensing means comprise a probe arranged in said exhaust means adapted to monitor combustion gas composition therein and wherein said further valve control means include signal transmitting means connected to said probe and adapted to operate said valve means.

13. An internal combustion engine according to claim 2 wherein said aperture means comprise at least one aperture extending through said internal wall means and having a diameter of about 10 mm.

14. An internal combustion engine according to claim 1 wherein said cylinder and piston means comprise a plurality of individual cylinders and pistons, wherein said aperture means comprise at least one aperture extending into each of said cylinders, and wherein all of said apertures are in joint communication with a manifold, said valve means comprising an adjustable throttle assembly mounted in said manifold.

* * * * *